April 12, 1955     T. A. ÖDMAN     2,706,109
HEAT TRANSFER ELEMENTS OF CERAMIC MATERIAL
Filed March 6, 1951
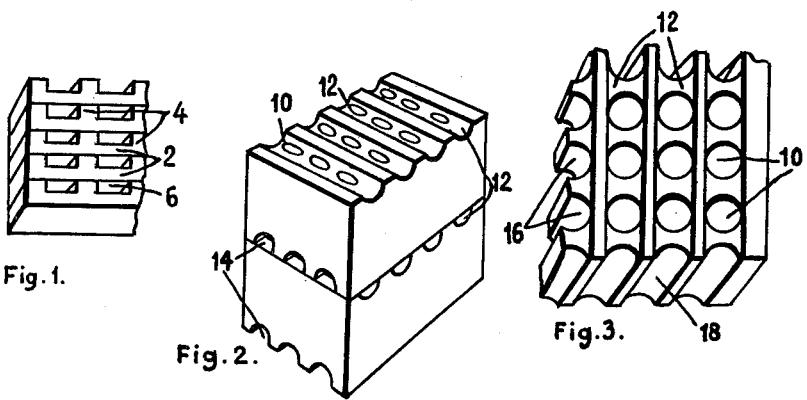
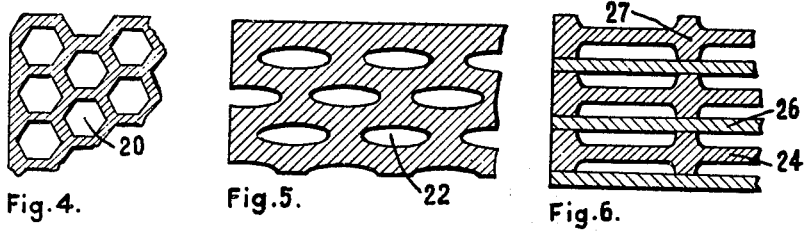
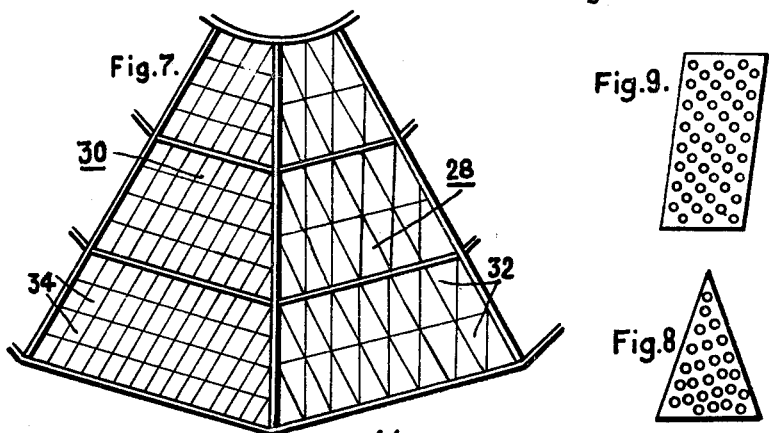
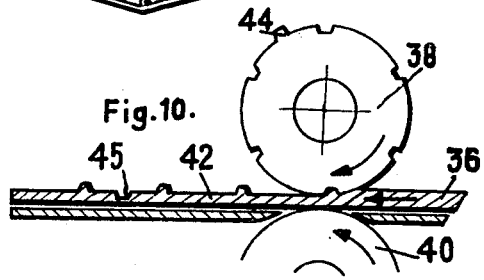

United States Patent Office 2,706,109
Patented Apr. 12, 1955

2,706,109

HEAT TRANSFER ELEMENTS OF CERAMIC MATERIAL

Tor Axel Ödman, Stockholm, Sweden, assignor, by mesne assignments, to Jarvis C. Marble, Leslie M. Merrill, and Percy H. Batten, trustees Application March 6, 1951, Serial No. 214,167

Claims priority, application Sweden March 11, 1950

7 Claims. (Cl. 263—51)

The present invention relates to regenerative air preheaters and more specifically to the heat exchanging material of such preheaters and to the manner and devices for manufacturing this material, that is, the regenerative mass.

The invention will be hereinafter described with respect to rotary air preheaters of the Ljungström type although it is to be understood that the invention is also adaptable to other types of regenerative preheaters.

At present plate type elements are almost exclusively used for the regenerative mass although different kinds of materials have been proposed for use, for example, stones, slag, bricks and the like, which are resistant to the temperatures encountered. As a matter of fact the plate type element involves definite disadvantages in that the temperature is restricted to relatively low values and that deficiencies may arise at the cold end by corrosion. Steel alloy plates of different metals have been tested and the regenerative mass has even been made up by enamel coated steels. The use of stones, slag, bricks and the like, however, has also definite disadvantages which have limited use of these materials to a limited extent. One of the greatest disadvantages is that the resistance to flow of the gases becomes exceptionally high in the preheater if the surface of the regenerative mass per volume unit is kept at reasonable values. Consequently, a preheater having such a regenerative mass will be heavy and voluminous and as a rule the pressure drop therethrough will be high.

Therefore the object of the present invention is substantially to provide a new and improved form of a regenerative mass consisting of a non-metallic material and composed of elements made of burnt clays, cement and the like, and a manner and device for manufacturing these elements, the elements being so formed that they have a large surface as compared with their volume and may be disposed near to one another side by side or in superimposed relation in any suitable manner without the free passage for the gaseous media being obstructed or rendered difficult. Furthermore, the total pressure drop in the preheater will be low. A preheater provided with a regenerative mass according to the invention will have a size very little larger than that made up of plate elements and, furthermore, the total pressure drop will be equal or less than that of a preheater of ordinary type.

For effecting the above and other objects, which will be described more in detail in the following, the invention has for its objects forms and devices according to the accompanying drawings which, by way of example but without limitations, disclose suitable forms for the manufacturing of elements according to the invention.

In the drawings:

Fig. 1 shows an element according to the invention.

Figs. 2 and 3 show other forms of elements according to the invention.

Figs. 4, 5 and 6 show diagrammatically various types of channel patterns.

Fig. 7 shows sectors in a preheater subdivided in two different ways.

Figs. 8 and 9 show different form of elements.

Fig. 10 shows a device for the manufacturing of details for an element as shown in Fig. 1.

In the drawings Fig. 1 shows an element of ceramic material composed of plates 2 provided with single faced elevations, notches 4, the purpose of which is to space the plates so that channels 6 are formed therebetween and which also serve to hold the elements apart and at the same time providing the largest surface possible.

In Fig. 2 is shown another form of an element also provided with throughgoing channels 10 which in this case are circular. In order to permit the elements to be piled upon one another so that the free passage for the through flowing gas or air is not obstructed or made difficult, the upper and lower faces are provided with furrows 12 and 14 disposed in alignment with the throughgoing channels 10 and preferably in different ways, for example at an angle to one another. As a result of this the elements may be piled up in a relatively arbitrary manner without the channels being able to clog one another. Likewise any displacement of the elements will not obstruct the passage of gases.

Also the outer faces may be provided with recesses in the way described in connection with the disclosure of Fig. 1. Such an element is also shown by way of example in Fig. 3 where two surfaces disposed at an angle to one another are provided with recesses 16 and 18.

In the foregoing the channels of the elements have been shown as rectangular (6 in Fig. 1) or circular (10 in Figs. 2 and 3), but they may also be formed in another way, for example as shown in Fig. 4, namely hexagonal as denoted at 20 or as long ellipses 22 as shown in Fig. 5. Such elements may be made of clay, which is burnt, or they may be cast of cement or any similar material.

In Fig. 6 is shown another form of the invention where an element is composed of plates in the same way as shown in Fig. 1. Some of the plates 24 are provided with spacing double faced elevations, notches 27, and the intermediate plates 26 may be smooth or patterned for increasing the heat transmitting coefficient.

In Fig. 7 there is shown two sectors 28 and 30 of a rotor of a preheater, which by way of example are subdivided in two different ways. The sector 28 is divided into mutually equal triangles 32 and the sector 30 into mutually equal parallellograms 34. In the first case the regenerative mass of the sector may be built up by triangularly formed elements according to Fig. 8 and in the latter case by quadrilateral elements as shown in Fig. 9, which also may be formed rectangularly in section.

The material which can be used in forming elements is evidently clays which after burning become resistant to fire and corrosion. Also cement and like materials, which as a rule are cast in forms and thereafter chemically burnt, may be used to the extent they can withstand high temperatures and relatively high temperature variations and also are free from corrosion. Moreover slag or glass and such materials may be useful in certain cases where the temperature is not too high but the possibilities of corrosion are great at the cold end.

In Fig. 10 there is diagrammatically shown, by way of example but not by way of limitation, a device for manufacturing of plates of clay for elements as shown in Fig. 1. A string of clay 36 is fed inbetween two pairs of rollers 38 and 40, one of which, 38, is provided with furrows running in parallel with the axis, so as to obtain corresponding elevations in the clay string 42 after the passage of the rollers. The clay string 42 is divided into suitable lengths which are piled upon one another so that an element, for example as shown in Fig. 1, is formed. The cutting of the string 42 into suitable lengths may also be performed by providing the roller 38 with a notch 44 which at equal distances makes a deep indentation for fracture in the clay string 42.

The invention is evidently not limited to the embodiment herein shown and described, but the same may have a plurality of forms within the scope of the invention. The furrows of the rollers 38 and 40 may, for example, be formed around the circumference of the one roller instead of being disposed axially.

What is claimed is:

1. Heat transfer material for regenerative heat exchangers comprising elements of ceramic material adapted to be assembled with their external faces in abutting relation to form heat transfer masses, each of said elements having opposite end faces and a plurality of side faces connecting said end faces and a plurality of passages extending from one to the other of said end faces for flow of gaseous fluid through the element, said passages being distributed to provide a plurality of series of terminal openings in each of two angularly related directions in the planes of the respective end faces, at least one of said end faces having a plurality of grooves to provide lateral communication between different series of said terminal openings in one of said directions.

2. A structure as defined in claim 1 in which both end faces of the element have a plurality of grooves each providing lateral communication between a plurality of passages, the grooves in the respective end faces being disposed so that those in one face provide lateral communication in one direction and those in the opposite face provide lateral communication in a different direction.

3. A structure as defined in claim 1 in which the end faces are polygonal and said passages are arranged so that said terminal openings provide series of rows in each of said end faces in each of two different directions.

4. A structure as defined in claim 3 in which each of said end faces is grooved, grooves in one end face providing lateral communication between rows of openings extending in one of said different directions and the grooves in the opposite end face providing lateral communication between rows of openings extending in the other of said different directions.

5. A structure as defined in claim 4 in which said end faces are rectangular and said rows of openings are at right angles to each other.

6. A structure as defined in claim 1 in which at least one of said side faces is provided with a series of grooves extending between said end faces.

7. A structure as defined in claim 6 in which opposite side faces are provided with series of grooves extending between said end faces and communicating with the ends of the grooves in at least one of the latter faces.

References Cited in the file of this patent

UNITED STATES PATENTS

| | | |
|---|---|---|
| 610,292 | Thornton | Sept. 6, 1898 |
| 1,452,742 | Johnston | Apr. 24, 1923 |
| 1,670,127 | Stancliffe | May 15, 1928 |
| 2,018,223 | Otto | Oct. 22, 1935 |
| 2,018,224 | Otto | Oct. 22, 1935 |
| 2,432,198 | Karlsson et al. | Dec. 9, 1947 |
| 2,495,960 | George | Jan. 31, 1950 |
| 2,506,244 | Stopka | May 2, 1950 |
| 2,507,862 | Mead | May 16, 1950 |
| 2,552,937 | Cohen | May 15, 1951 |

FOREIGN PATENTS

| | | |
|---|---|---|
| 580,562 | France | Apr. 23, 1924 |
| 614,453 | Great Britain | Dec. 15, 1948 |